United States Patent
McClendon et al.

(10) Patent No.: US 10,713,854 B2
(45) Date of Patent: Jul. 14, 2020

(54) HOME VISUALIZATION TOOL (71) Applicant: PPG Industries Ohio, Inc., Cleveland, OH (US)

(72) Inventors: Christopher L. McClendon, Mars, PA (US); Phillip J. Behrens, McDonald, PA (US); Courtney Lavonne Miller, Pittsburgh, PA (US); Theodore Judson Cromwell, Weirton, WV (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 15/752,153

(22) PCT Filed: Aug. 12, 2016

(86) PCT No.: PCT/US2016/046797
§ 371 (c)(1),
(2) Date: Feb. 12, 2018

(87) PCT Pub. No.: WO2017/027811
PCT Pub. Date: Feb. 16, 2017

(65) Prior Publication Data
US 2018/0253908 A1    Sep. 6, 2018

Related U.S. Application Data

(60) Provisional application No. 62/204,165, filed on Aug. 12, 2015.

(51) Int. Cl.
*G06T 15/04*      (2011.01)
*G06T 19/20*      (2011.01)
*G06T 11/60*      (2006.01)

(52) U.S. Cl.
CPC .............. *G06T 19/20* (2013.01); *G06T 11/60* (2013.01); *G06T 15/04* (2013.01); *G06T 2210/04* (2013.01); *G06T 2219/2012* (2013.01)

(58) Field of Classification Search
CPC ..... G06T 15/04; G06T 19/20; G06T 2210/04; G06T 2219/2012; G06T 11/60;
(Continued)

(56) References Cited

U.S. PATENT DOCUMENTS 4,321,037 A * 3/1982 Miller .................... G09B 29/00
434/74
5,986,670 A   11/1999 Dries et al.
(Continued)

FOREIGN PATENT DOCUMENTS

CA       2823944    7/2012
EP       2419866    2/2012
(Continued)

OTHER PUBLICATIONS

Aidan Chopra, "Google SketchUp for Dummies," Wiley Publishing, Inc., 2007. http://www.geometrija.matf.bg.ac.rs/geometrija4/GoogleSketchUpforDUMmIES.pdf (Year: 2007).*
(Continued)

*Primary Examiner* — Sing-Wai Wu
(74) *Attorney, Agent, or Firm* — Michael J. Frodsham (57) ABSTRACT

A method for creating a house visualization template can comprise receiving a first exterior image of a first house. The method can also include creating a set of first boundaries that define a first type of decorative feature of the first house. Additionally, the method can include receiving a first set of decorative images that depict various different instances of the first type of decorative feature. The method can also comprise generating from each of the decorative images of the first set of decorative images respective first decorative feature masks. The first decorative feature masks may be configured to selectively overlay an area encompassed by the set of first boundaries, such that the first exterior image of the first house is selectively displayable with any of the
(Continued)

instances of the first type of decorative features within the first set of decorative images.

24 Claims, 6 Drawing Sheets

(58) Field of Classification Search
CPC .......... A23L 7/122; A23P 20/25; A23P 30/25; A23V 2002/00
See application file for complete search history.

(56) References Cited

U.S. PATENT DOCUMENTS

| | | |
|---|---|---|
| 6,727,925 B1 | 4/2004 | Bourdelais |
| 6,767,925 B1 | 7/2004 | Deihl |
| 7,330,585 B2 | 2/2008 | Rice et al. |
| 9,245,064 B2 * | 1/2016 | Loberg ................ G06F 17/5004 |
| 2005/0081161 A1 * | 4/2005 | MacInnes ........... G06F 17/5004 715/765 |
| 2006/0122915 A1 | 6/2006 | Allen |
| 2007/0016435 A1 | 1/2007 | Bevington |
| 2007/0034694 A1 | 2/2007 | Carlson et al. |
| 2010/0262551 A1 | 10/2010 | Caruso |
| 2013/0179841 A1 | 7/2013 | Mutton |

FOREIGN PATENT DOCUMENTS

| | | |
|---|---|---|
| EP | 2661676 | 11/2013 |
| WO | 2010120873 | 10/2010 |
| WO | 2012094309 | 7/2012 |

OTHER PUBLICATIONS

Chopra-video, Youtube video "Google SketchUp for Dummies—SketchUp: Stretching a photo over a face," by Aidan Chopra, Published on Jul. 6, 2007. https://www.youtube.com/watch?v=SE3I9zsTkQE (Year: 2007).*

Sherman Williams Color Visualizer [online]. retrieved May 31, 2019. <URL: http://www.sherwin-williams.com/homeowners/color/find-and-explore-colors/paint-colors-by-family/SW6107/#/6109/?s=products&p=PS0>.

* cited by examiner

HOME VISUALIZATION TOOL

BACKGROUND OF THE INVENTION

Many different systems and methods have been introduced that are intended to assist a user in selecting a particular coating for a project. For example, a conventional method for selecting a desired coating may include a customer identifying a paint chip of interest at a paint store. The customer may then choose to buy the paint simply based upon the chip itself. Alternatively, the customer may choose to take the paint chip home and try to visualize the color from the paint chip applied to the target surface. One will understand the difficultly of picking a color based upon a conventional card sized paint chip.

In contrast, some more recent conventional methods allow a user to take a picture of an object and digitally retrieve color data from the object. This method can be particularly useful when the customer is attempting to match a coating to a previously coated surface that has been damaged. Additionally, this method may also be useful when the customer wants to coat a target surface with a particular color that the customer is otherwise unable to identify.

While conventional paint selection methods provide several systems by which a customer can select a paint color, there are still significant shortcomings. For example, conventional systems and methods provide deficient methods for visualizing coatings on a finished product. In many cases, in order to see how a room will look with a particular color of paint, a user must first paint a majority of rooms. Obviously, painting the room in order to determine if a color is acceptable is both expensive and time consuming.

Some newer methods have begun to digitally paint user uploaded photographs of rooms, or other objects to be painted. The methods however tend to render poor visual representations of both the color and the target of the painting. In many cases, users are left to old methods of using small paint chips to determine the color or finish of a room. Accordingly, there are many problems in the art to be addressed.

BRIEF SUMMARY OF THE INVENTION

The present invention comprises systems, methods, and computer program products for providing a user with an interactive coating and a decorative feature selection interface. For example, the present invention can comprise a system for allowing a user to customize coatings and decorative features on a depicted building facade. Additionally or alternatively, the depicted building facade comprises a photograph of an actual building facade. Further, the user-customized decorative features and/or coatings may also comprise photographs of actual decorative features and/or coatings that are selectively integrated into the photograph of the building facade.

Disclosed embodiments relate to a computerized method for creating a house visualization template for visualizing the interchange of various decorative features of a house, wherein the method can include receiving, using at least one processor, a first exterior image of a first house. As used herein, a "house" and all references to a "house" or "room" are provided only for the sake of example. One will understand that the inventions disclosed herein are applicable to any building, structure, or target object. As such, the use of the word "house" or "room" is not limiting to the scope of this invention.

The first exterior image can depict various decorative features of the first house. The method can also include creating, using the at least one processor, a set of first boundaries that define a first type of decorative feature of the first house. Additionally, the method can include receiving, using the at least one processor, a first set of decorative images that depict various different instances of the first type of decorative feature. The decorative images can comprise photographs of various different instances of the first type of decorative feature.

The method can also include generating, using the at least one processor, from each of the decorative images respective first decorative feature masks. The first decorative feature masks are configured to selectively overlay an area encompassed by the set of first boundaries, such that the first exterior image of the first house is selectively displayable with any of the instances of the first type of decorative features within the first set of decorative images.

In an additional or alternative example, the present invention also relates to a computerized method for visualizing, at an end-user device, the interchange of various decorative features of a house using a house visualization template created according to the method for creating a house visualization template according to the present invention. The visualization method can include displaying, using at least one processor, a first exterior image of a first house, wherein the first exterior image can include various decorative features of the first house. The first exterior image of the first house can for example comprise a first photograph of the first house. The method can also include displaying, using the at least one processor, a first set of decorative feature indications. The first set of decorative feature indications may include different selectable decorative features of a first type. The different selectable decorative features of the first type are associated with generated first decorative feature masks. Additionally, the method can include displaying a second set of decorative feature indications. The second set of decorative feature indications can comprise different selectable decorative features of a second type. The different selectable decorative features of the second type are associated with generated second decorative feature masks.

Further, the method can also include receiving, using the at least one processor, an indication from a user input device of a selection of a particular indication within the first set of decorative feature indications. The particular indication may be associated with a first decorative feature. Further still, the method can include displaying, using the at least one processor, on a digital display, a second exterior image of the first house. The second exterior image of the first house can comprise the first exterior image of the first house with the first decorative feature incorporated, making use of the associated first decorative feature mask, into the first exterior image such that the first decorative feature replaces an original decorative feature within the first exterior image.

The present invention also relates to a computer system being configured to implement the computerized methods according to the present invention as well as to a computer program product comprising one or more computer storage media having stored thereon computer-executable instructions that, when executed by at least one processor, cause a computer system to perform such computerized method.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and computer program products for providing a user with an interactive coating and a decorative feature selection interface. For example, the present invention can comprise a system for allowing a user to customize coatings and decorative features on a depicted building facade. Additionally or alternatively, the depicted building facade comprises a photograph of an actual building facade. Further, the user-customized decorative features and/or coatings may also comprise photographs of actual decorative features and/or coatings that are selectively integrated into the photograph of the building facade.

Accordingly, the present invention can provide significant benefits to a user selecting multiple coatings and/or decorative features at the same time. For example, as opposed to using a single paint chip and trying to mentally visualize the presence of the paint chip color on a building facade, the present invention allows a user to dynamically switch between various coatings and/or decorative features and have a finished image of a building facade displayed, with the accompanying user-customized coatings and features.

Additionally, the present invention can include displaying an actual photograph of an exterior of a building, with actual photographs of each respective decorative feature and/or coating dynamically incorporated into the photograph of the building. As such, a user is provided with a highly accurate depiction of the customized building facade.

Additionally, when customizing a particular picture of a building, a user may be presented with images of optional coatings and decorative features. In addition or alternatively, the images of optional coatings and decorative features that are displayed to a user are the same images that are manipulated for incorporation into the image of the building facade. Accordingly, additional or alternative implementations of the present invention can provide a user with highly accurate depictions of a customized building facade.

Figure 1:
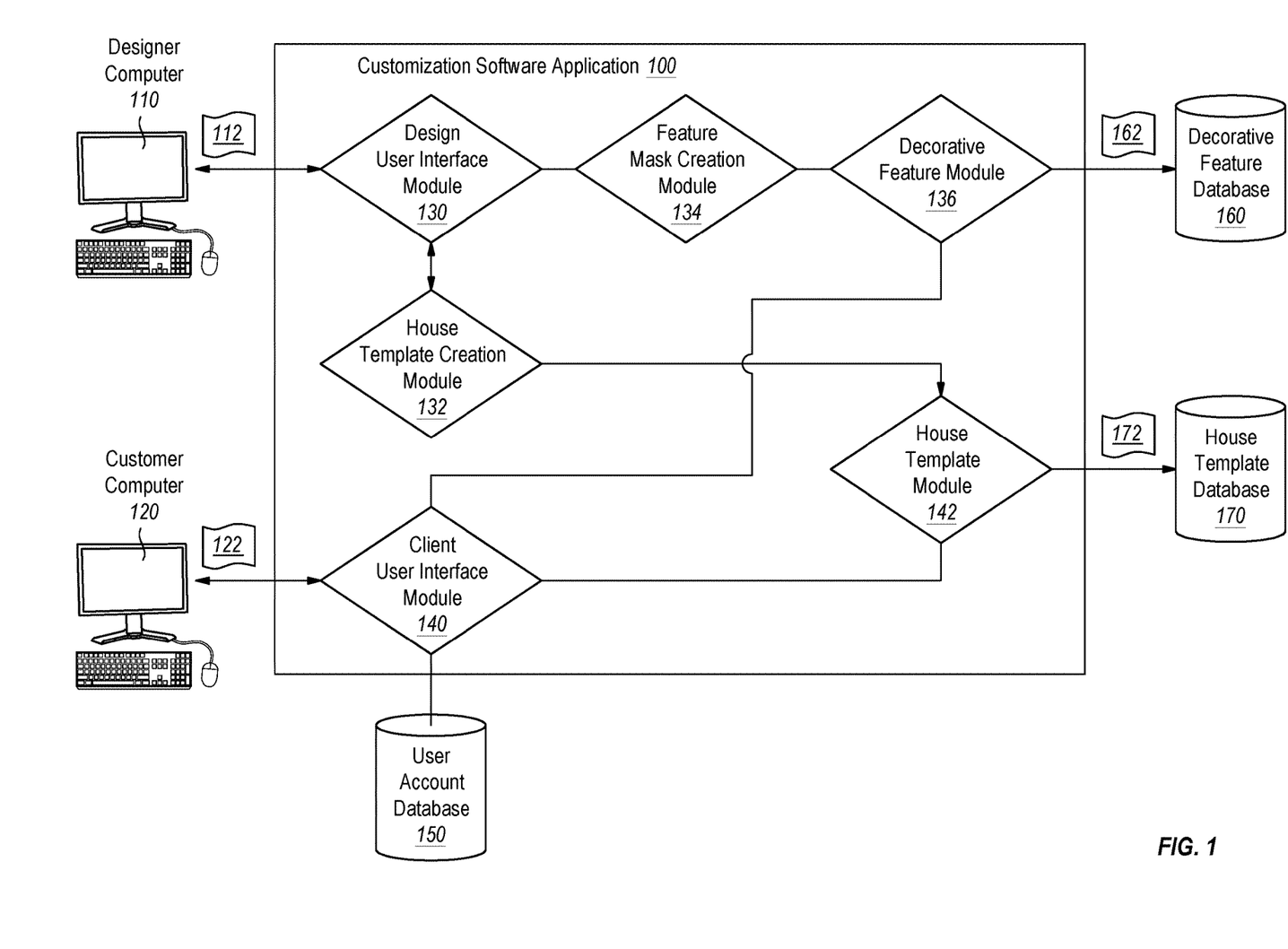
FIG. 1 depicts a schematic diagram of a system for customizing images of a building in accordance with the present invention.

FIG. 1 depicts a schematic diagram of a system for customizing images of a building in accordance with implementations of the present invention. In particular, FIG. 1 depicts a designer computer 110 and a customer computer 120 in communication with a customization software application 100. The designer computer 110 and the customer computer 120 may comprise the same computer. Additionally, one or both of the customer computer 120 and the designer computer 110 may be in communication with the customization software application 100 through a network connection.

The customization software application 100 may comprise various modules, such as a design user interface module 130, a house template creation module 132, a feature mask creation module 134, a decorative feature module 136, a client user interface module 140, and a house template module 142. As used herein, a module may comprise a software component, including a software object, a hardware component, such as a discrete circuit, a field programmable gate array (FPGA), a computer processor, or some combination of hardware and software.

One will appreciate that the modules described herein are provided for the sake of clarity and example. In particular, one will understand that the various modules may be otherwise combined or separated and still fall within the scope of the present invention.

Along these lines, the customization software application 100 may also be in communication with one or more databases. For example, the customization software application 100 may be in communication with a user account database 150, a decorative feature database 160, and/or a house template database 170. As used herein, a database may comprise locally stored data, remotely stored data, data stored within an organized data structure, data stored within a file system, or any other stored data that is accessible to the customization software application 100.

The present invention can include a system where a designer can use the designer computer 110 to create house templates. A house template can comprise a photograph, or other digital image, of a house or building. The designer can upload a photograph 112 of a building or house from the design computer 110 into the customization software application 100. For example, the design user interface module 100 may provide an interface for selecting a photograph available to the designer and uploading the photograph into the house template creation module 132.

Figure 2A:
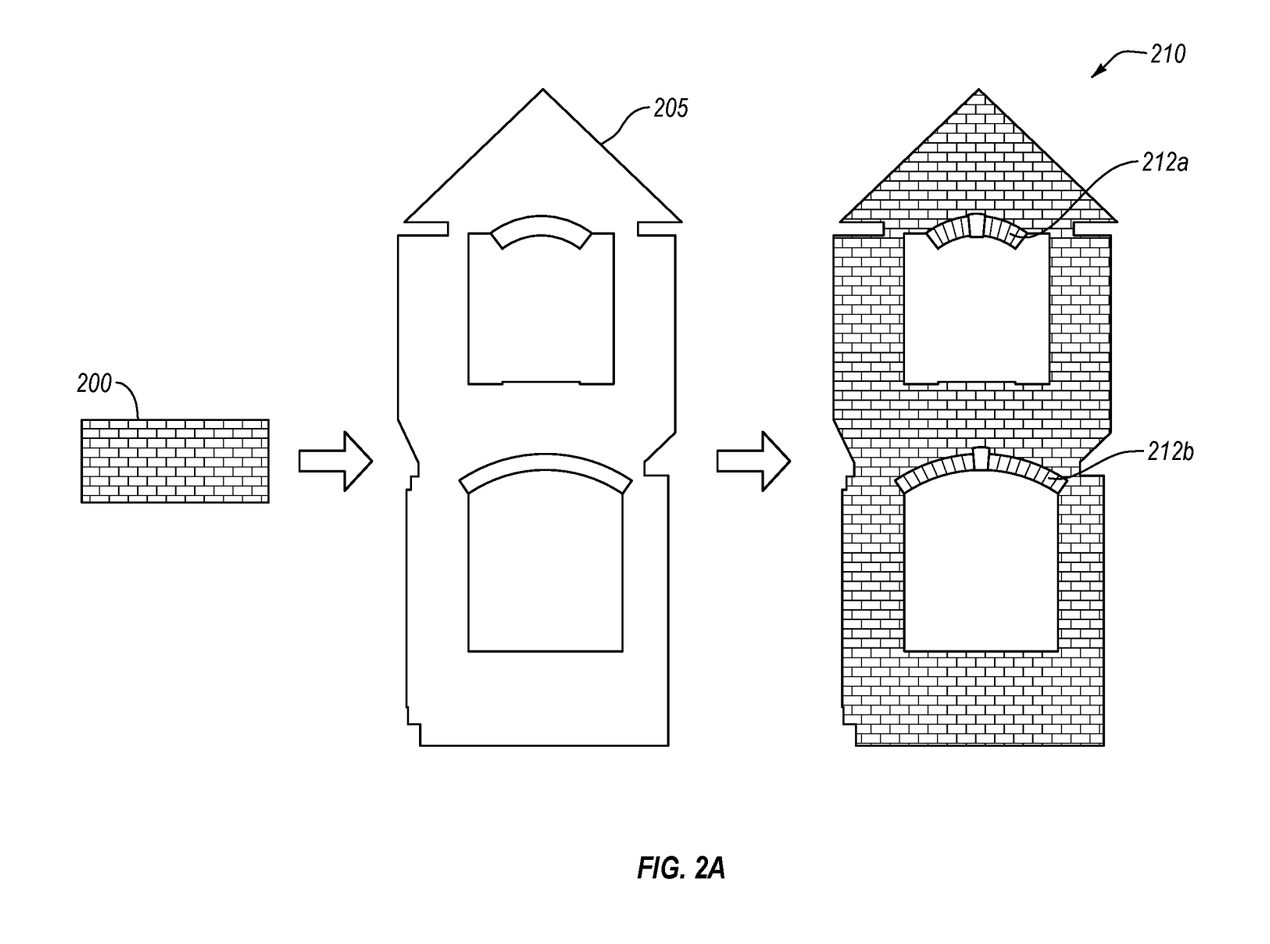
FIG. 2A depicts exemplary steps in a process of creating a decorative feature mask in accordance with the present invention.
Figure 2B:
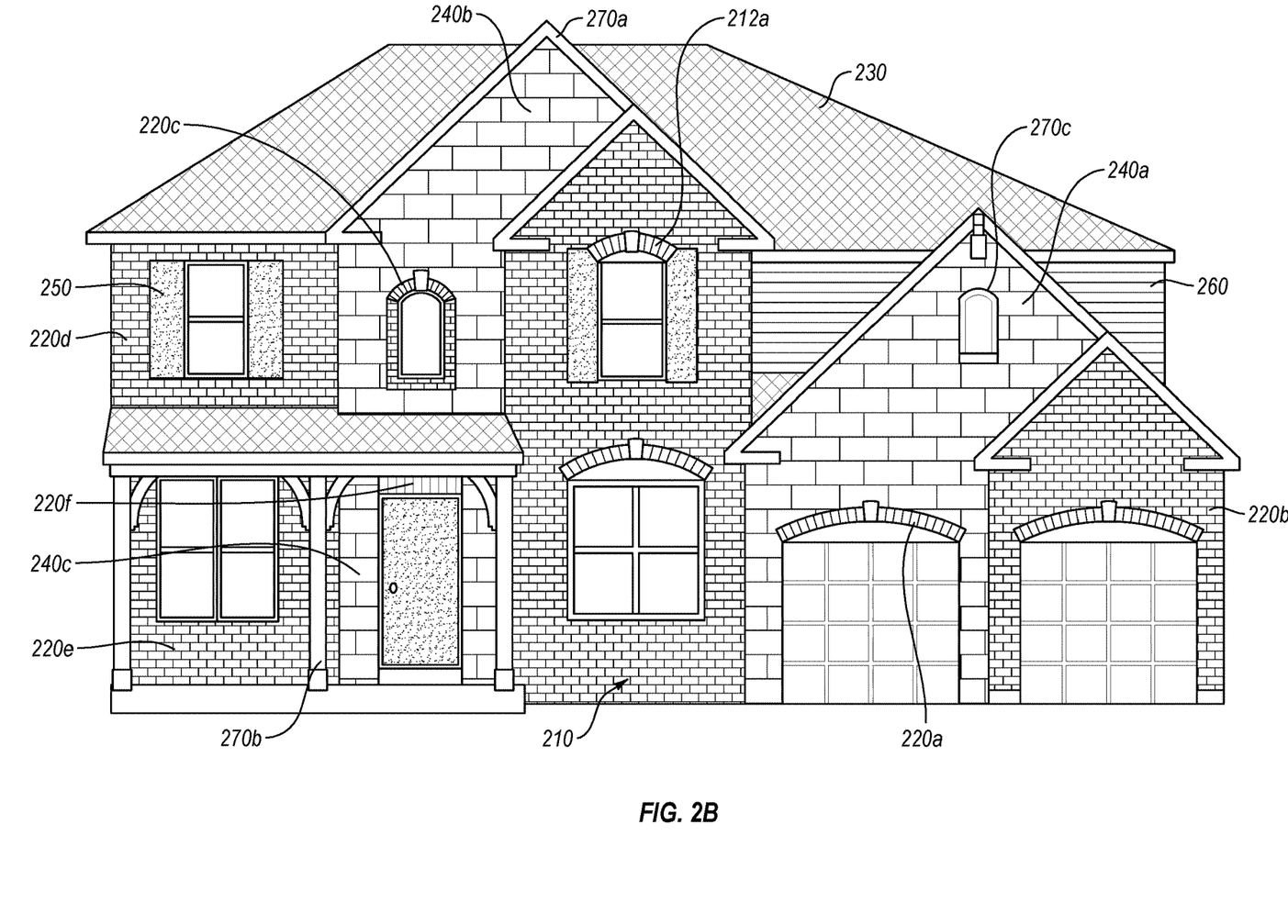
FIG. 2B depicts an exemplary exterior image of a house for creating boundaries outlining decorative features in accordance with the present invention.

The housing template creation module 132 can provide a designer with tools to associate particular portions of a digital image of a house or building with specific features. For example, FIG. 2B depicts a photograph of a house. The depicted house comprises a variety of different decorative features, including a brick facade 210, 220(*a-e*), a stone facade 240(*a-c*), a siding with a particular coating color facade 260, a particular color and style of shingles 230, a particular type and color of shutters 250, and other decorative features. Decorative features can include any external portion of a housing or building structure that provides aesthetic features to a home.

The house template creation module 132 can further provide a designer with tools to outline each specific decorative feature and to associate different outlined areas with each other. For example, the designer can create boundaries that outline brick facade 220*b* and brick facade 220*d*. The designer can then associate the two outlined areas with each other, such that the house template creation module 132 is notified that the two areas 220*b*, 220*d* comprise the same decorative feature type. The designer can further associate the outlined areas with a particular type of decorative feature. For instance, the house template creation module 132 can provide the designer with an option to associate the two areas 220*b*, 220*d* with a brick-type decorative feature.

In additional or alternative implementations, the house template creation module 132 can store the photograph 112 and associated decorative feature boundary information within a house template database 170. For example, once the designer has finished creating the boundaries that outline the decorative features and associating them with a particular decorative feature type, the house template creation module 132 can send the photograph and associated decorative feature outline information 172 to the house template module 142. The house template module 142 can comprise various methods and systems for managing access to the house template database 170.

In addition to creating house and building templates, in additional or alternative implementations, a designer at the designer computer 110 can also create feature masks through the design user interface module 130. A feature mask may comprise a digitally manipulated photograph of a particular decorative feature type. Each feature mask may also be custom designed for incorporation into a particular house template.

The design user interface module 130 can provide a designer computer 110 with an interface for selecting and uploading an image of a particular type of decorative feature. For example, FIG. 2A depicts an exemplary photograph of a particular type of brick 200. The photograph of the particular type of brick may comprise a photograph of a brick wall that comprises the type of brick of interest.

In additional or alternative implementations, the feature mask creation module 134 may provide a designer with tools to digitally manipulate the photograph 200 into a decorative feature mask 210. For example, the feature mask creation module 134 may provide a decorative area template 205 for the designer. The decorative area template 205 may directly correspond with an area 210 that the designer outlined when creating a house template. In additional or alternative implementations, the decorative area template 205 may comprise outlines of relevant features without a particular type of decorative feature being displayed.

The feature mask creation module 134 can provide a designer with the necessary digital tools to replicate, crop, distort, and otherwise manipulate the photograph 200, or cropped portions thereof, as needed to create a decorative feature mask 210. In particular, the feature mask creation module 134 can provide necessary tools for creating a visually accurate decorative feature mask 210 from a photograph 200 of a decorative feature of interest.

For example, a particular photograph 200 of a decorative feature may have been taken from a different distance and/or perspective than a corresponding decorative feature within the photograph of a house or building of interest. As such, a designer may scale the size of the photograph 200 of the decorative feature so that it is true-to-scale with respect to the photograph of the house or building of interest. Additionally, the designer may distort photo components 200 used in the decorative feature mask 210, such that bricks that are closer in perspective to a viewer appear larger than bricks that are more distant. For instance, the designer may account for a vanishing point when replicating and manipulating photo components 200 to create a realistic view of a decorative feature mask 210.

Additionally, the feature mask creation module 134 can provide the designer with tools to correctly shade each respective decorative feature mask 210. For example, a particular decorative feature mask 210 may be located directly below an eave such that a shadow should be cast by the eave onto the decorative feature. The feature mask creation module 134 can similarly provide a designer with tools to properly shade the decorative feature mask 210. For example, the feature mask creation module 134 may comprise a rendering engine that automatically incorporates a shadow based upon a light source origination point. Alternatively, the feature mask creation module 134 may provide the designer with manual shading tools to manually incorporate a shadow.

The feature mask creation module 134 may also provide tools for creating intricate ornamentation elements of a decorative feature mask. For instance, the decorative feature mask 210 of FIG. 2A comprises decorative arches 212(*a, b*) over the windows. The feature mask creation module 134 can provide tools for a designer to crop a single brick from the photo 200 and distort the originally rectangular brick into various wedge shapes of appropriate size for the decorative arches 212(*a, b*).

Returning to FIG. 2B, the depicted house comprises a wide variety of different decorative features 210, 220(*a-f*), 230, 240(*a-c*), 250, 260, 270(*a-c*). Many of the decorative features, such as brick 210, 220(*a-f*), appear at multiple distinct regions of the house facade. FIG. 2A and the accompanying description describe the creation of a decorative feature mask 210 that comprises a single contiguous region of the house facade. In addition, a designer can link multiple distinct sets of boundaries such that every area that is associated with a particular type of decorative feature is included within a single mask. For example, all of the brick areas 210, 220(*a-f*) depicted within the house may be associated with a single mask.

Additionally, one will understand that the methods and systems for receiving images of decorative features and creating house- or building-specific masks from those images can be applied to a wide variety of different decorative features and houses or buildings. For example, FIG. 2B shows that the exemplary house comprises stone decorative features 240(*a-c*). Using the method described above, a designer can create decorative masks 210 from other types of stone and present those masks to a user for customization of the house.

Accordingly, in at least one implementation of the present invention, a designer working at the designer computer 110 can upload images of houses and/or buildings and decorative features. In additional or alternative implementations, the images can comprise actual photographs of the houses and/or buildings and decorative feature. Once uploaded, the designer can create a set of boundaries within the images of the houses to outline respective decorative feature types.

Additionally or alternatively, the designer can create decorative feature masks 210 from the images of the decorative features. For example, the designer can manipulate and replicate components of a photograph of a decorative feature to create a realistic decorative feature mask. The designer can repeat this process for any number of different types of decorative features.

Figure 3A:
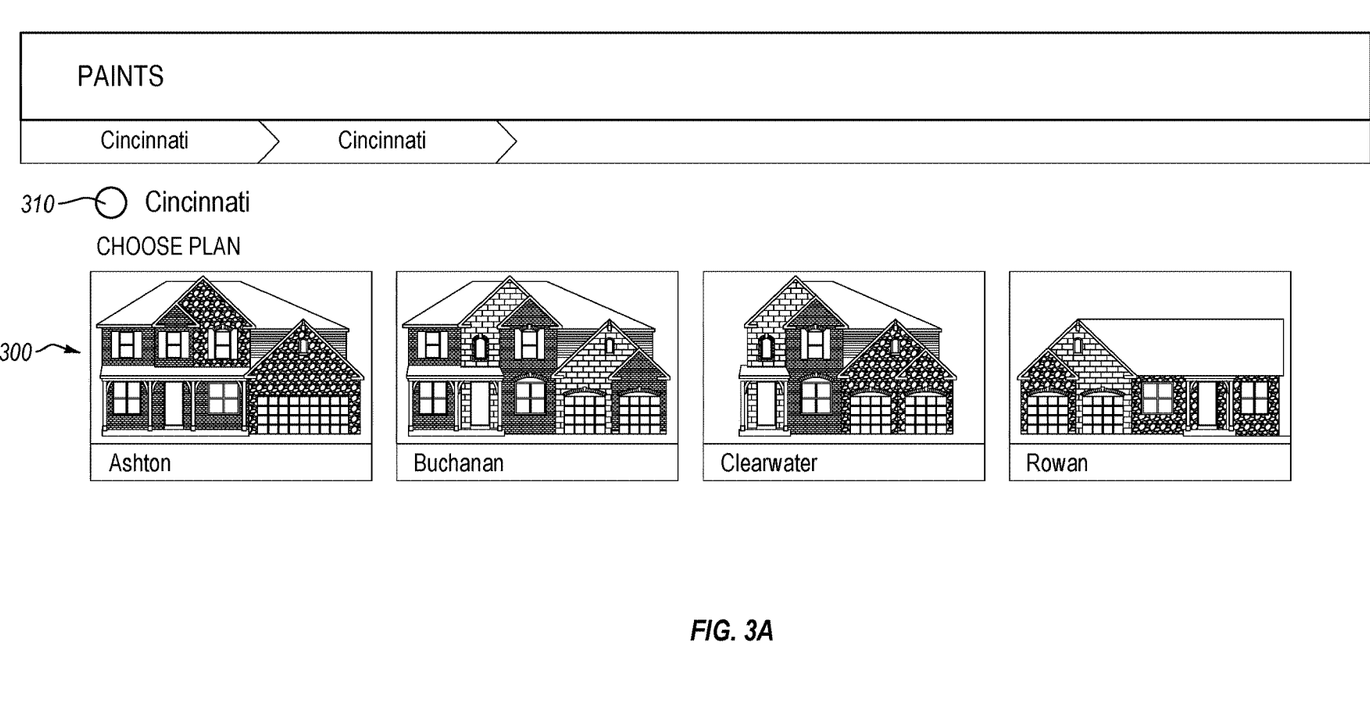
FIG. 3A depicts an exemplary user interface for customizing a house or building facade in accordance with the present invention.
Figure 3B:
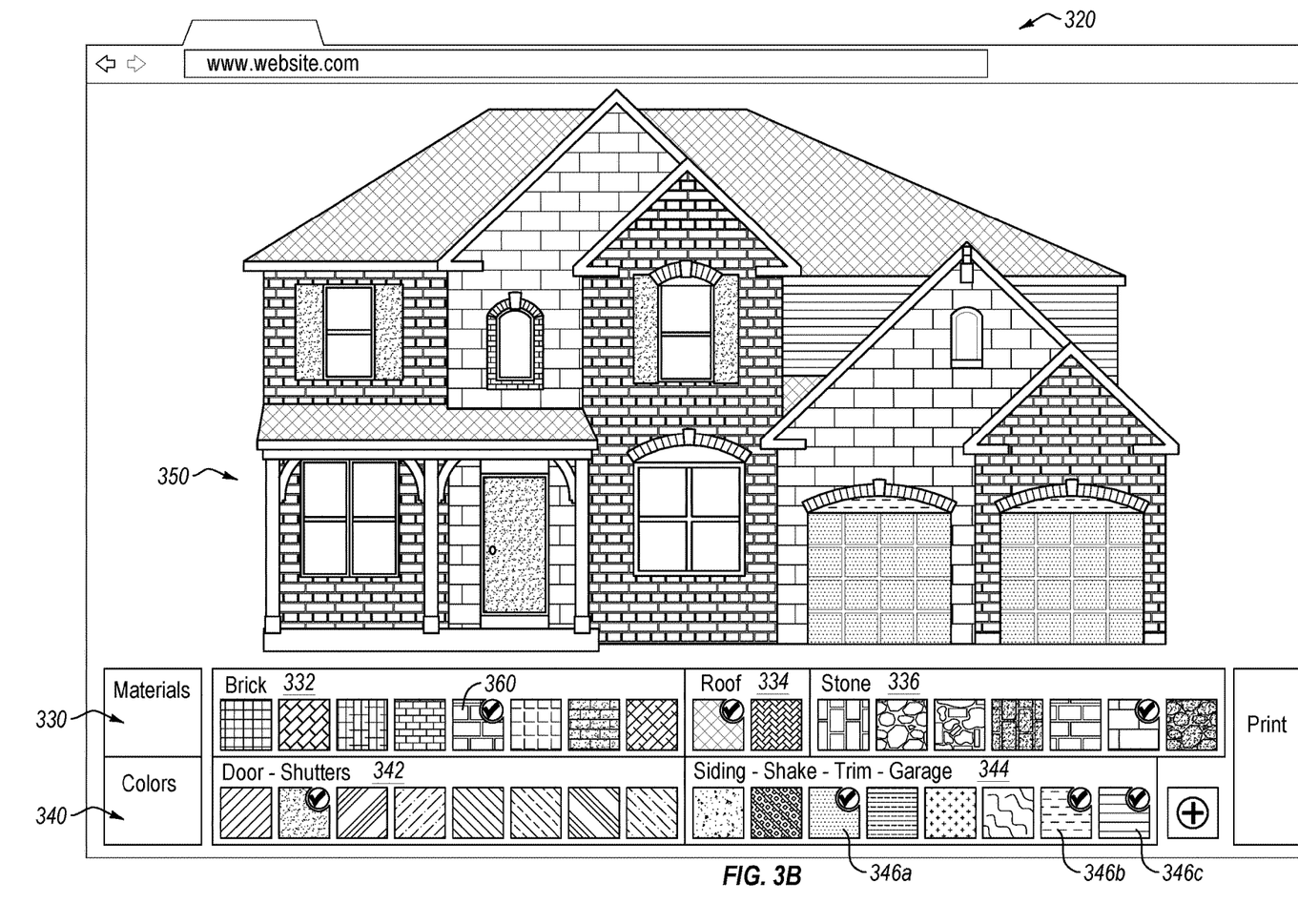
FIG. 3B depicts another exemplary user interface for customizing a house or building facade in accordance with the present invention.

Once a designer has created one or more house image templates and one or more decorative feature masks, a customer can create a proposed building facade design. For example, FIGS. 3A and 3B depict exemplary user interfaces for customizing a house or building facade in accordance with the present invention. As depicted, the user interface can comprise a website; however, this is only exemplary and it is contemplated by the applicants that user interface can be integrated within a standalone application.

In addition, the present invention further provides a customer computer 120 that can send and receive information 122 related to the customization of a house or building facade. For example, the customer computer 120 can receive a user interface 300 from a client user interface module 140. The client user interface module 140 can provide a webpage that is hosted at a remote server, an application interface that is executed by a remote server and communicated to the customer computer 120, or an application interface that is executed locally on the remote computer 120.

When presented with the user interface 300, a user may be provided with an option to select a particular house or building type. One will understand that the various methods and systems described above for creating house templates and decorative feature masks can be applied to a wide variety of different buildings and houses. For example, each of the depicted houses in FIG. 3A may have associated house templates and associated boundary information relating to each houses' respective decorative features. Accordingly, a user can select different decorative features to integrate into the respective images of the different houses.

Additionally, the selection of a house or building type may be limited or otherwise associated with permission characteristics of the user. For example, some houses or buildings may only be available in particular locations 310. Additionally, particular users may have predetermined interests that exclude some available houses or buildings such as houses or buildings with limited number of rooms. In at least one implementation, upon selecting a house type in interface 300, a user is provided with a subset of different configurations for the selected house type. As such, a user may provide further structural customization before deciding upon decorative features.

In addition, the client user interface module 140 can be in communication with a user account database 150. The user account database 150 may comprise information relating to the location of a user, the interests of a user, previous searches performed by a user, and other similar user-specific data. For example, the client user interface module 140 may automatically display a selection of houses that is most popular within the user's region. As such, a user may be required to log into the customization software application 100. Once a user is logged in, the client user interface module 140 can customize the interface 320 and the available house or building options to the particular user's profile stored within the user account database 150.

Once a user selects a house, the client user interface module 140 requests the selected house image template from the house template module 142. The house template module 142 can then retrieve the requested house image template 172 from the house template database 170 and forward the house image template to the client user interface module 140 for display. A customization interface 320 can then display a photograph of the selected house 350 and various customization options 330, 340 on the customer computer 120. The photograph of the selected house 350 may comprise the original photograph taken of the house with or without any decorative feature masks 210 applied.

A user may then be presented with various options through a user interface for customizing the house or building facade. For example, FIG. 3B depicts a user interface 320 for customizing a building or house facade in accordance with additional or alternative implementations of the present invention. The depicted customization interface 320 can comprise options for customizing brick color and type 332, roof shingle color and type 334, stone color and type 336, door and shutter color 342, and siding, shake, trim 270(*a-c*), and garage color 344. In at least one implementation, the depicted customization options may comprise the original photographs 200 that were used to generate the decorative feature masks 210. Using the various provided customization options, a user can selectively adjust the displayed photograph (i.e., the house template) of the selected house.

As a user selects different customization options 332, 334, 336, 342, 344, the client user interface module 140 can request 162 the associated decorative feature masks from the decorative feature module 136. The decorative feature module 136 can then retrieve the desired decorative feature mask from the decorative feature database 160 and forward the decorative feature mask 210 to the client user interface module 140. Upon receiving the decorative feature mask 210, the client user interface module 140 can incorporate the decorative feature mask 210 into the house image template 350.

Additionally, as the user selects various options for decorative features, the client user interface module 140 can display suggested complementary features. For example, a user may select a particular color of clay tile for the roof covering. Upon receiving the selection of the clay tile, the decorative feature module 136 can access within the decorative feature database 160 various complementary features, such as a matching color of stucco. As such, as a user works to customize a house, the customization software application 100 can automatically provide suggestions for other decorative features based upon popular combinations and/or pre-determined combinations of features. Similar suggestions can be made based upon the user's location, the selected house type, information associated with the user, and other similar variables.

A user can select multiple indications of a particular decorative feature type. For example, a user can select multiple coating colors 346(*a-c*) within the coating color category 344. The different selected colors 340 can be applied to different respective portions (siding, shake, trim, garage) of the depicted house or building.

Accordingly, a user can select from a variety of different customization options 332, 334, 336, 342, 344 and receive a near-instant view of what the house or building facade would look with the selected configuration. In addition, the depicted building facade and selected options may also comprise actual photographs of a building facade and actual photographs of decorative features that have been incorporated into each other. As such, a user can be provided with a photo-realistic view of his or her selected house or building configuration.

Accordingly, FIGS. 1-3B and the corresponding text illustrate or otherwise describe one or more components, modules, and/or mechanisms for creating a house visualization template for visualizing the interchange of various decorative features of a house. One will appreciate that implementations of the present invention can also be described in terms of computerized methods comprising one or more acts for accomplishing a particular result. For example, FIGS. 4 and 5 and the corresponding text illustrate or otherwise describe a sequence of acts, which can each be carried out using at least one processor, in a computerized method for creating a house visualization template for visualizing the interchange of various decorative features of a house or in a computerized method of visualizing the interchange of various decorative features of a house using such house visualization template, respectively. The acts of FIGS. 4 and 5 are described below with reference to the components and modules illustrated in FIGS. 1-3B.

Figure 4:
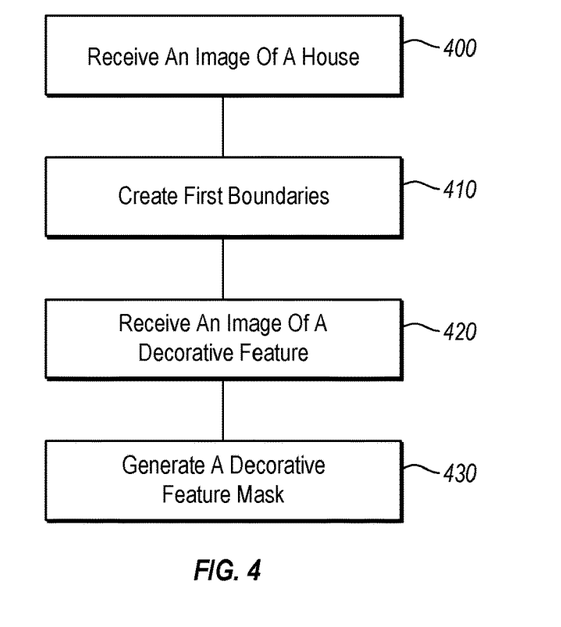
FIG. 4 depicts a flow of an exemplary method for creating a house visualization template for visualizing the interchange of various decorative features of a house in accordance with the present invention.
Figure 5:
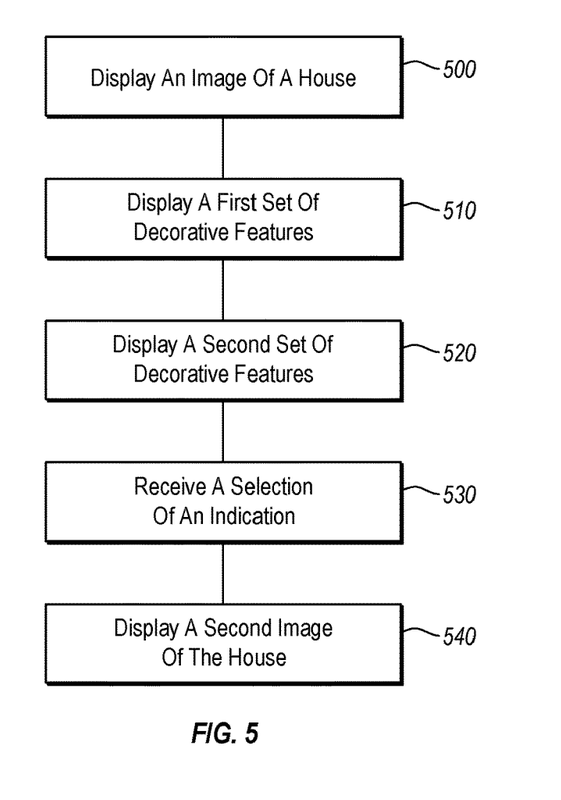
FIG. 5 depicts a flow of an exemplary method for visualizing, at an end-user device, the interchange of various decorative features of a house using a created home visualization template in accordance with the present invention.

For example, FIG. 4 demonstrates that a method for creating a house visualization template for visualizing the interchange of various decorative features of a house can include an act 400 of receiving an exterior image of a house. Act 400 can comprise receiving a first exterior image of a first house, wherein the first exterior image depicts various decorative features of the first house. For example, as described in FIG. 1 and the accompanying description, a designer computer 110 can upload an image file 112 to the customization software application 100. The image file may comprise a digitally created image of an exterior of a house, a hand-drawn-and-then-digitized image of an exterior of a house, or a photograph of an exterior of a house.

Additionally, FIG. 4 shows that the method can comprise an act 410 of creating first boundaries. Act 410 can include creating a set of first boundaries that define a first type of decorative feature of the first house. For example, as described in FIGS. 1-2B and the accompanying description, the house template creation module 132 can provide a designer, at the designer computer 110, with tools necessary to cause the house template creation module 132 to create boundaries that outline various types of decorative features on the facade of the house or building. For instance, a designer can outline boundaries that surround a portion of the facade that comprises brick 210.

FIG. 4 also shows that the method can comprise an act 420 of receiving an image of a decorative feature. Act 420 can include receiving a first set of decorative images that depict various different instances of the first type of decorative feature, wherein the decorative images can comprise photographs of various different instances of the first type of decorative feature. For example, as described in FIG. 1 and the accompanying description, a designer computer 110 can upload an image file 112 to the customization software application 100. The image file may comprise a digitally created image of a decorative feature (e.g., brick), a hand-drawn-and-then-digitized image of a decorative feature, or a photograph of a decorative feature.

In addition, FIG. 4 shows that the method can comprise an act 430 of generating a decorative feature mask. Act 430 can include generating from each of the decorative images of the first set of decorative images respective first decorative feature masks. The first decorative feature masks may be configured to selectively overlay an area encompassed by the set of first boundaries, such that the first exterior image of the first house is selectively displayable with any of the instances of the first type of decorative features within the first set of decorative images. For example, as described in FIGS. 1-3B and the accompanying description, the feature mask creation module 134 can provide a designer, at the designer computer 110, with tools necessary to manipulate an image, such as photograph 200, to fit within a decorative area template 205. The resulting decorative feature mask can then be integrated into an exterior image of a house. For instance, a user interface 320 can be presented to a user that provides the user with options 330, 340 for integrating a number of different decorative features 332, 334, 336, 342, 344 into an exterior image of a house (e.g., photograph 350).

In addition to the foregoing, FIG. 5 depicts that an additional or alternative method of visualization, at an end-user device, the interchange of various decorative features of a house using a house visualization template created according to the present invention can comprise an act 500 of displaying an exterior image of a house. Act 500 can include displaying a first exterior image of a first house, wherein the first exterior image of the first house including various decorative features of the first house. The first exterior image of the first house can comprise a photograph of an exterior of the first house including various decorative features of the first house. For example, as described in FIGS. 1 and 3B and the accompanying descriptions, the client user interface module 140 can display at a customer computer 120 a customization user interface 320. The customization user interface 320 can comprise an image of an exterior of a house or building (e.g., house photograph 350).

Additionally, FIG. 5 shows that the method can comprise an act 510 of displaying a first set of decorative features. Act 510 can include displaying a first set of decorative feature indications, wherein the first set of decorative feature indications comprise different selectable decorative features of a first type. The different selectable decorative features of a first type can be associated with respective first decorative feature masks. The first decorative feature masks can be generated as set forth above. For example, as described in FIG. 3B and the accompanying description, the customization user interface 320 can comprise various different sets of decorative feature indications (e.g., 332, 334, 336, 342, 344). The sets of decorative feature indications can be distinguishable by decorative feature type.

FIG. 5 also shows that the method can comprise an act 520 of displaying a second set of decorative features. Act 520 can include displaying a second set of decorative feature indications, wherein the second set of decorative feature indications comprise different selectable decorative features of a second type. The different selectable decorative features of a second type can be associated with respective second decorative feature masks. The second decorative feature masks can be generated as set forth above. For example, as described in FIG. 3B and the accompanying description, the customization user interface 320 can comprise various different sets of decorative feature indications (e.g., 332, 334, 336, 342, 344). The sets of decorative feature indications can be distinguishable by decorative feature type.

In addition, FIG. 5 shows that the method can comprise an act 530 of receiving a selection of an indication. Act 530 includes receiving an indication from a user input device of a selection of a particular indication within the first set of decorative feature indications, wherein the particular indication is associated with a first decorative feature. For example, as described in FIGS. 1 and 3B and the accompanying description, the client user interface module 140 can receive a selection 122 from a user at the customer computer 120. The selection can comprise clicking on a particular indication of a decorative feature 332, 334, 336, 342, 344 from within the user customization interface 320.

Further, FIG. 5 shows that the method can comprise an act 540 of displaying a second exterior image of the house. Act 540 includes displaying, on a digital display, a second exterior image of the first house, wherein the second exterior image of the first house comprises the first image, e.g. photograph, of the exterior of the first house with the first decorative feature incorporated, making use of the associated first decorative feature mask, into the first image (e.g. photograph) such that the first decorative feature replaces an original decorative feature within the first exterior image. For example, as described in FIG. 3B and the accompanying description, a customer can select a particular indication of a decorative feature 360. Once the customer selects the decorative feature indication 360, the exterior image of the house or building (e.g., 350) can be automatically updated to reflect the newly incorporated decorative feature 360.

Accordingly, the present invention and corresponding alternatives described herein provide significant benefits to a customer desiring to select various decorative features. For example, a customer may be able to view actual photographs of a desired house or building with actual photograph-based decorative features incorporated into the image of the house. As such, a user is presented with a true-to-life depiction of a desired house configuration.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. For example, while the invention has been described in terms of "a" first boundary, "a" first decorative feature, "a" first image, and the like, one or more of any of these items is within the scope of the invention. In addition, in this application, the use of "or" means "and/or" unless specifically stated otherwise, even though "and/or" may be explicitly used in certain instances. "Including", "such as", "for example" and like terms means "including/such as/for example but not limited to".

In view of the foregoing the present invention therefore relates in particular, without being limited thereto, to the following aspects:

1. A computerized method for creating a house visualization template for visualizing the interchange of various decorative features of a house, the method comprising:
    receiving, using at least one processor, a first exterior image of a first house, wherein the first exterior image depicts various decorative features of the first house;
    creating, using the at least one processor, a set of first boundaries that define a first type of decorative feature of the first house;
    receiving, using the at least one processor, a first set of decorative images that depict various different instances of the first type of decorative feature, wherein the decorative images comprise photographs of various different instances of the first type of decorative feature; and
    generating, using the at least one processor, from each of the decorative images of the first set of decorative images respective first decorative feature masks;
    wherein the first decorative feature masks are configured to be selectively placed over an area encompassed by the set of first boundaries, such that the first exterior image of the first house is selectively displayable with any of the instances of the first type of decorative features within the first set of decorative images.

2. The method according to Aspect 1, wherein the various decorative features comprise a particular shingle color, a particular siding color, a particular brick color, and a particular stone color.

3. The method according to Aspect 1 or 2, wherein:
    the set of first boundaries comprise multiple distinct regions that comprise the first type of decorative feature, and
    at least one of the first decorative feature masks is configured to overlay all of the multiple distinct regions.

4. The method according to any one of the preceding Aspects further comprising:
    receiving, using the at least one processor, a second exterior image of a second house that is structurally different than the first house, wherein the second exterior image depicts various decorative features of the second house;
    creating, using the at least one processor, a set of second boundaries that define the first type of decorative feature of the second house;
    generating, using the at least one processor, from each of the decorative images respective second decorative feature masks, wherein:
    the second decorative feature masks are configured to selectively overlay an area encompassed by the set of second boundaries, such that the second exterior image of the second house is selectively displayable with any of the instances of the first type of decorative features within the first set of decorative images.

5. The method according to preceding Aspect 4, further comprising:
    Creating, using the at least one processor, a set of third boundaries that define a second type of decorative feature of the first house;
    Receiving, using the at least one processor, a second set of decorative images that depict various different instances of the second type of decorative feature, wherein the decorative images comprise photographs of various different instances of the second type of decorative feature;
    Generating, using the at least one processor, from each of the decorative images of the second set of decorative images respective third decorative feature masks;
    wherein the third decorative feature masks are configured to selectively overlay an area encompassed by the set of third boundaries, such that the first exterior image of the first house is selectively displayable with any of the instances of the second type of decorative features within the second set of decorative images.

6. The method according to any one of the preceding Aspects, wherein the first decorative feature masks are configured to maintain the three-dimensional visual aspects of the area encompassed by the first boundaries.

7. The method according to any one of the preceding Aspects, wherein a portion of at least one of the decorative images within the first set of decorative images is reused multiple times within at least one of the first decorative feature masks.

8. The method according to any one of the preceding Aspects, wherein each of the first set of decorative images comprises photographs of a respective type of brick and each of the first decorative feature masks consist of one or more portions of respective images within the first set of decorative images.

9. A computerized method for visualizing, at an end-user device, the interchange of various decorative features of a house using a house visualization template created according to any one of claims 1 to 8, the method comprising:

Displaying, using at least one processor, a first exterior image of a first house for which a house visualization template has been created, wherein the first exterior image includes various decorative features of the first house;

displaying, using the at least one processor, a first set of decorative feature indications, wherein the first set of decorative feature indications comprise different selectable decorative features of a first type, which are associated with respective generated first decorative feature masks;

receiving, using the at least one processor, an indication from a user input device of a selection of a particular indication within the first set of decorative feature indications, wherein the particular indication is associated with a first decorative feature; and displaying, using the at least one processor, on a digital display, a second exterior image of the first house, wherein the second exterior image of the first house comprises the first exterior image of the first house with the first decorative feature incorporated, making use of the associated first decorative feature mask, into the first exterior image such that the first decorative feature replaces an original decorative feature within the first exterior image.

10. The method according to Aspect 9, wherein the different selectable decorative features of the first type comprise a paint color.

11. The method according to any one of Aspects 9 to 10, further comprising displaying, using the at least one processor, a second set of decorative feature indications, wherein the second set of decorative feature indications comprise different selectable decorative features of a second type, which are associated with respective generated second decorative feature masks, wherein the different selectable decorative features of the second type preferably comprise a decorative feature type selected from a group consisting of brick color, stone color, stain color, and shingle color.

12. The method according to Aspect 11, further comprising:

Receiving, using the at least one processor, another indication from the user input device of a selection of yet another indication within the second set of decorative feature indications, wherein the other indication is associated with a second decorative feature; and Sending, using the at least one processor, new display instructions to the digital display, the new display instructions comprising a third exterior image of the first house;

wherein:
the third exterior image of the first house comprises the first exterior image of the first house with the first decorative feature incorporated into the first photograph;
the first decorative feature replaces an original decorative feature within the first exterior image and the second decorative feature is incorporated, making use of the associated second decorative feature mask, into the first exterior image such that the second decorative feature replaces another original decorative feature within the first exterior image.

13. The method according to any one of Aspects 9 to 12, wherein incorporating the first decorative feature and/or the second decorative feature into the first exterior image comprises incorporating at least a portion of a photograph of the first decorative feature into the first exterior image.

14. The method according to any one of Aspects 1 to 8 or the method according to any one of Aspects 9 to 13, wherein the first exterior image of the first house comprises a photograph.

15. A computer system having one or more processors, system memory, and one or more computer-readable media storing computer-executable instructions, the computer system being configured to implement a computerized method for creating a house visualization template for visualizing the interchange of various decorative features of a house as defined in any one of Aspects 1 to 8 or 14 and/or a computerized method for visualizing, at an end-user device, the interchange of various decorative features of a house as defined in any one of Aspects 9 to 14.

16. A computer program product comprising one or more computer storage media having stored thereon computer-executable instructions that, when executed by at least one processor, cause a computer system to perform a method for creating a house visualization template for visualizing the interchange of various decorative features of a house as defined in any one of Aspects 1 to 8 or 14 and/or a computerized method for visualizing, at an end-user device, the interchange of various decorative features of a house as defined in any one of claims 9 to 14.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computerized method of creating, at an end-user device, a house visualization template for visualizing the interchange of various decorative features of a house, the method comprising:

displaying a first exterior image of a first house, wherein the first exterior image comprises a first photograph of the first house including various decorative features of the first house;

displaying a first set of decorative feature indications, wherein the first set of decorative feature indications comprise different selectable decorative features of a first type;

displaying a second set of decorative feature indications, wherein the second set of decorative feature indications comprise different selectable decorative features of a second type;

receiving an indication from a user input device of a selection of a particular indication within the first set of decorative feature indications, wherein the particular indication is associated with a first decorative feature; and displaying, on a digital display, a second exterior image of the first house, wherein the second exterior image of the first house comprises the first photograph of the first house with the first decorative feature incorporated into the first photograph such that the first decorative feature replaces an original decorative feature within the first photograph receiving another indication from the user input device of a selection of yet another indication within the second set of decorative feature indications, wherein the other indication is associated with a second decorative feature; and displaying, on the digital display, a third exterior image of the first house;
wherein:
the third exterior image of the first house comprises the first photograph of the first house with the first decorative feature incorporated into the first photograph;
the first decorative feature replaces an original decorative feature within the first photograph and the second decorative feature incorporated into the first photograph; and
the second decorative feature replaces another original decorative feature within the first photograph.

2. The method as recited in claim 1, wherein the different selectable decorative features of the first type comprise a paint color.

3. The method as recited in claim 2, wherein incorporating the first decorative feature into the first photograph comprise incorporating at least a portion of a photograph of the first decorative feature into the first photograph.

4. The method as recited in claim 2, wherein the different selectable decorative features of the second type comprise a decorative feature type selected from a group consisting of brick color, stone color, stain color, and shingle color.

5. The method as recited in claim 1, wherein incorporating the second decorative feature into the first photograph comprises incorporating at least a portion of a photograph of the second decorative feature into the first photograph.

6. The method as recited in claim 1, further comprising:
displaying exterior images of a plurality of different houses, wherein each exterior image comprises a photograph of a respective house; and
receiving an indication from a user input device selecting an exterior image of a particular house, wherein the exterior image of the particular house comprises the first exterior image of the first house.

7. The method as recited in claim 6, further comprising:
identifying permission characteristics of a user; and
based upon the permission characteristics, displaying to the user a specific subset of exterior images of houses, wherein the subset of exterior images comprises the plurality of different houses.

8. The method as recited in claim 7, wherein:
the permission characteristics of the user are associated with a geographical area; and the subset of exterior images is defined by the plurality of different houses that are available within the geographical area.

9. The method as recited in claim 1, wherein upon receiving the indication from a user input device of the selection of the particular indication within the first set of decorative feature indications, the second exterior image is automatically displayed.

10. A computer program product comprising one or more computer storage media having stored thereon computer-executable instructions that, when executed at a processor, cause the computer system to perform a method of creating, at an end-user device, a house visualization template for visualizing the interchange of various decorative features of a house, the method comprising:
displaying a first exterior image of a first house, wherein the first exterior image comprises a first photograph of the first house including various decorative features of the first house;
displaying a first set of decorative feature indications, wherein the first set of decorative feature indications comprise different selectable decorative features of a first type;
displaying a second set of decorative feature indications, wherein the second set of decorative feature indications comprise different selectable decorative features of a second type;
receiving an indication from a user input device of a selection of a particular indication within the first set of decorative feature indications, wherein the particular indication is associated with a first decorative feature; and
displaying, on a digital display, a second exterior image of the first house, wherein the second exterior image of the first house comprises the first photograph of the first house with the first decorative feature incorporated into the first photograph such that the first decorative feature replaces an original decorative feature within the first photograph
receiving another indication from the user input device of a selection of yet another indication within the second set of decorative feature indications, wherein the other indication is associated with a second decorative feature; and
displaying, on the digital display, a third exterior image of the first house;
wherein:
the third exterior image of the first house comprises the first photograph of the first house with the first decorative feature incorporated into the first photograph;
the first decorative feature replaces an original decorative feature within the first photograph and the second decorative feature incorporated into the first photograph; and
the second decorative feature replaces another original decorative feature within the first photograph.

11. The computer program product as recited in claim 10 wherein the different selectable decorative features of the first type comprise a paint color.

12. The computer program product as recited in claim 11, wherein incorporating the first decorative feature into the first photograph comprise incorporating at least a portion of a photograph of the first decorative feature into the first photograph.

13. The computer program product as recited in claim 11, wherein the different selectable decorative features of the second type comprise a decorative feature type selected from a group consisting of brick color, stone color, stain color, and shingle color.

14. The computer program product as recited in claim 10, wherein incorporating the second decorative feature into the first photograph comprise incorporating at least a portion of a photograph of the second decorative feature into the first photograph.

15. The computer program product as recited in claim 10, further comprising:
displaying exterior images of a plurality of different houses, wherein each exterior image comprises a photograph of a respective house; and
receiving an indication from a user input device selecting an exterior image of a particular house, wherein the exterior image of the particular house comprises the first exterior image of the first house.

16. At a remote computer of a computer system comprising the remote computer system, a customer computer system, one or more processors, system memory, and one or more computer-readable media storing computer-executable instructions, the computer system configured to implement a computerized method for creating a house visualization template for visualizing the interchange of various decorative features of a house, the method comprising:

receiving at the remote computer from the customer computer a first exterior image of a first house, and the remote computer creating a set of first boundaries that define a first type of decorative feature of the first house;

receiving a first set of decorative images that depict various different instances of the first type of decorative feature;

generating from each of the decorative images corresponding first decorative feature masks to be used in connection with one or more user selectable indications, such that, upon user selection of an indication at the customer computer, the decorative feature masks are placed over an area encompassed by the set of first boundaries;

sending display instructions to the customer computer, the display instructions instructing display of the first house in connection with (i) a first set of decorative feature indications comprising different selectable decorative features of a first type, and (ii) a second set of decorative feature indications comprising different selectable decorative features of a second type;

receiving from the customer computer a user selection of a particular indication to display a decorative feature of the first type of decorative feature; and sending display instructions to the customer computer to display a second exterior image of the first house, wherein the second exterior image of the first house comprises the first photograph of the first house such that the first decorative feature replaces an original decorative feature within the first photograph;

receiving another indication from the user input device of a selection of yet another indication within the second set of decorative feature indications, wherein the other indication is associated with a second decorative feature; and sending display instructions to the customer computer to display a third exterior image of the first house, wherein the third exterior image of the first house displays the first photograph showing (i) the first decorative feature, as well as (ii) the second decorative feature in place of another original decorative feature within the first photograph.

17. The system as recited in claim 16, wherein the first exterior image of the first house comprises a photograph.

18. The system as recited in claim 16, wherein the various decorative features comprise a particular shingle color, a particular siding color, a particular brick color, and a particular stone color.

19. The system as recited in claim 16, wherein:
the set of first boundaries comprise multiple distinct regions that comprise the first type of decorative feature; and
at least one of the first decorative feature masks is configured to overlay all of the multiple distinct regions.

20. The system as recited in claim 16, wherein the method further comprises:
receiving a second exterior image of a second house that is structurally different than the first house, wherein the second exterior image depicts various decorative features of the second house;
creating a set of second boundaries that define the first type of decorative feature of the second house;
generating from each of the decorative images respective second decorative feature masks;
wherein:
the second decorative feature masks are configured to selectively overlay an area encompassed by the set of second boundaries; and
the second exterior image of the second house is selectively displayable with any of the instances of the first type of decorative features within the first set of decorative images.

21. The system as recited in claim 20, wherein the method further comprises:
creating a set of third boundaries that define a second type of decorative feature of the first house;
receiving a second set of decorative images that depict various different instances of the second type of decorative feature, wherein the decorative images comprise photographs of various different instances of the second type of decorative feature;
generating from each of the decorative images of the second set of decorative images respective third decorative feature masks;
wherein the third decorative feature masks are configured to selectively overlay an area encompassed by the set of third boundaries, such that the first exterior image of the first house is selectively displayable with any of the instances of the second type of decorative features within the second set of decorative images.

22. The system as recited in claim 16, wherein the first decorative feature masks are configured to maintain the three-dimensional visual aspects of area encompassed by the first boundaries.

23. The system as recited in claim 22, wherein a portion of at least one of the decorative images within the first set of decorative images is reused multiple times within at least one of the first decorative feature masks.

24. The system as recited in claim 22, wherein each of the first set of decorative images comprises photographs of a respective type of brick and each of the first decorative feature masks consist of one or more portions of respective images within the first set of decorative images.

* * * * *

UNITED STATES PATENT AND TRADEMARK OFFICE
CERTIFICATE OF CORRECTION

PATENT NO. : 10,713,854 B2
APPLICATION NO. : 15/752153
DATED : July 14, 2020
INVENTOR(S) : McClendon et al.

Page 1 of 1

It is certified that error appears in the above-identified patent and that said Letters Patent is hereby corrected as shown below:

In the Claims

<u>Column 18</u>
Line 66, change "the" to –a–

Signed and Sealed this
Eighteenth Day of August, 2020

Andrei Iancu
*Director of the United States Patent and Trademark Office*